United States Patent [19]

Lane et al.

[11] Patent Number: 4,913,741
[45] Date of Patent: Apr. 3, 1990

[54] CHEMICAL ADDITIVE FOR HYDRAULIC CEMENT MIXES

[75] Inventors: Donald R. Lane, Richfield; Jose A. Melendez, Bedford, both of Ohio

[73] Assignee: Solvay Construction Materials, Inc., Walton Hills, Ohio

[21] Appl. No.: 372,919

[22] Filed: Jun. 29, 1989

[51] Int. Cl.⁴ ............................................. C04B 24/08
[52] U.S. Cl. ...................................... 106/88; 106/95; 106/314
[58] Field of Search ....................... 106/88, 90, 95, 314

[56] References Cited

U.S. PATENT DOCUMENTS 4,689,083 8/1987 Gutmann et al. ...................... 106/88
4,737,193 4/1988 Gutmann et al. ...................... 106/88

Primary Examiner—William R. Dixon, Jr.
Assistant Examiner—Chris Gallo
Attorney, Agent, or Firm—James A. Hudak

[57] ABSTRACT

A hydraulic cement mix comprising a hydraulic cement, aggregate in an amount of up to 80% by weight based upon the total weight of said cement mix, sufficient water to effect hydraulic setting of the cement, and an air-entraining additive consisting essentially of a coconut fatty acid diethanolamine produced by reacting alkyl ester of coconut acid with diethanolamine, a capramide diethanolamide and ricinoleic acid, said additive being in an effective amount whereby air will be entrained in said mix in an amount of 3% to 9% by volume of said mix.

18 Claims, No Drawings

CHEMICAL ADDITIVE FOR HYDRAULIC CEMENT MIXES

BACKGROUND ART

This invention pertains to concrete and cement additive compositions, known as air-entraining admixtures, for incorporation in hydraulic cement mixes, such as portland cement concretes and mortars, but not limited thereto, for the purpose of increasing the durability in the hardened state of such mixes, to freeze-thaw cycles under conditions of water saturation. The increased durability of the cementitious mix under such conditions is the result of the development in the plastic portland cement mix of a system of air bubbles that will remain in the mix after hardening and meet the specifications of resistance to freezing and thawing stipulated in ASTM designation C-260. This requires that the air void system be a specified amount as volume percent of the hardened cementitious mass, and that it have bubbles within a specified range of sizes and spacing parameters as designated by ASTM specification C-457. It is well known in the art that in order to meet these requirements, it is necessary to use surface active agents or surfactants to obtain the desired amount of air entrainment.

There are a number of chemical agents to achieve the specified air entrainment system. Generally, these are organic chemicals which are broadly classified as soaps and detergents. One of the best know chemical agents of this type is known in the art as Vinsol resin, which is a wood resin salt and is the standard against which other air-entraining agents are tested under ASTM specification No. C-233. Vinsol resin is normally employed as an aqueous alkaline solution that is added to a plastic, cementitious mix, either alone or in combination with other chemical admixtures. In the latter case, the Vinsol resin solution is added separately because of its chemical incompatibility with many other admixtures, due to the fact that the pH and the presence of calcium and various other ions renders insoluble the alkali-neutralized acids comprising Vinsol resin.

It is also known in the prior art to use a variety of surfactants, both anionic and nonionic, in the broad class of detergents to obtain a desirable degree of air entrainment in cement, mortar and concrete. Often these are used in various combinations. Some of these surfactants are sulfated ester ammonium salts of higher primary alcohols (or additional products with ethylene oxide) alkylbenzenesulfonic acid salts, salts of petroleum acids, fatty acids and proteinaceous substances, and organic salts of sulfonated hydrocarbons.

For example, U.S. Pat. No. 4,249,948 disclosed the use of an alpha olefin sulfonate with a water reducing agent wherein the former acts as an air-entraining agent in a hydraulic cement composition. U.S. Pat. No. 4,046,582 disclosed the use of a higher secondary alcohol oxyalkylene sulfate as an air-entraining agent, PCT International Application No. WO 85/01,500 (U.S. patent application Ser. No. 537,185; filed 9-29-83) discloses the use of a multicomponent air-entraining additive for hydraulic cement mixes which comprises a three-component mixture of an alkylarylsulfonic acid salt, an alkanolamine salt of a fatty acid such as tall oil, and a nonionic component selected from polyethylene glycol derivatives and diethanolamine adducts of cocamide derived from coconut oil.

However, these air-entraining additives are not entirely satisfactory with respect to the stability of the air bubbles in concrete, the ability to perform in the presence of fly ash in the mix, the effect on improving the workability of the concrete, the need to use higher dosages of admixtures known in the art, or tendencies to either lose air or to uncontrollably increase air content, as mixing time is extended. Loss of workability is measured by the slump cone in accordance with the American Society for Testing and Materials (ASTM) designation C-143. The biggest disadvantage is the reduction in compressive strengths by as much as 5% strength loss per 1% increase of entrained air. This loss is due, in part, to an irregular bubble sizing and the coalescence of bubbles in the mix causing larger voids, thus reducing the compressive strengths.

In portland cement concrete, sands vary in fineness from 2.2 to 3.5 fineness modulus, which is an empirical figure to determine coarseness of sand. The higher the fineness modulus (FM), the coarser the sand. It is well known that as the sand varies, plus or minus, from 2.7, it becomes increasingly difficult to entrain air in the portland cement concrete. When sands arrive at the range of an FM of 3.3, large doses of air entrainment additive are necessary to control the air.

Thus, there exists the continuing need to discover new and improved air-entraining agents, especially ones that will overcome the problems described above.

SUMMARY OF THE INVENTION

The present invention is a chemical additive for combining into hydraulic cement mixes, such as portland cement concrete, mortar and grout, including portland cement mixes which contain various amounts of fly ash or slag, for the purpose of entraining air therein, and the resulting improved mixes for incorporating an additive composition.

For purposes of this invention the term "hydraulic cement" refers to all cementitious compositions based primarily on silicates capable of being set and hardened by the action of water, such as portland cements, sulfate-resisting cement, blast furnace cements and pozzolanic cements, including cement mixes where a portion of the portland cement has been replaced by fly ash or slag. The term "portland cement" refers to all cementitious composition which have a high content of tricalcium silicate, conforming with the specifications set forth in ASTM designation No. C-150, and the portland blended cements such as those described in ASTM designation No. C-595.

Broadly, the invention comprises a portland cement mix including fly ash and/or slag cement, aggregate, sufficient water to effect hydraulic setting of the cement, and an air-entraining additive consisting essentially of an ester-derived coconut acid diethanolamide, also known as cocoamide diethanolamine, or cocamide DEA, as more fully described hereinafter. The cocamide DEA can be added in any convenient form, although it is most convenient to add it as an aqueous solution.

The dosage used should be an amount which is effective in entraining the desired amount of air, usually measured as a volume percentage of the hydraulic cement mix. As is known in the art, the amount of air entrained desired and intended to be is usually in the range of 3% to 9% air, by volume. This amount of air is achieved by a dosage of ester-derived cocamide DEA of between about 0.001% and 0.01% by weight based upon the weight of the cement.

The unexpected and nonobvious result obtained by employing ester-derived cocamide DEA by itself in a cementitious system undergoing extended mixing is to yield with a favorable dosage response an excellent air void system stable in the plastic cementitious system and having a desirable improved size distribution in the cementitious system after hardening, while yielding increased compressive strengths over reference mixes.

It is therefore the object of this invention to provide improved air-entrained portland cement mixes, including concrete, mortar, grout and dry mixes, which include an additive composition that will advantageously entrain an air void system having desired characteristics when said additive is employed over a relatively wide dosage range, or have a superior dosage response relative to functionally similar additives known in the art.

It is another object of this invention to provide improved strength results which include an additive composition that will entrain an air void system and increase compressive strengths over known air-entraining agents.

DESCRIPTION OF THE PREFERRED EMBODIMENT

The term "cocamide DEA" is a name the Cosmetic Toiletry, and Fragrance Association, or CTFA, has applied to a wide variety of coconut acid-based compositions comprising diethanolamine adducts of cocamide. Although they are all called cocamide DEA, they are produced by a variety of reactions. In one type of reaction, a 1:1 molar ratio reaction is produced between diethanolamine and either a coconut acid, also known as coconut fatty acid; an alkyl ester, usually methyl ester, of a coconut acid; or a coconut acid-based triglyceride, such as coconut oil. In another type of reaction, a 2:1 molar ratio is employed in the so-called Kritchevsky process, which is described in U.S. Pat. No. 2,094,609 to W. Kritchevsky.

The present invention has resulted from the unexpected discovery that cocamide DEA, produced by the methyl ester process, although other esters could be used, will, when employed by itself in effective amounts in hydraulic cement mixes, produce stable volumes of air having desirable size and distribution, such as are employed to increase the freeze-thaw durability of hydraulic cement mixes or to produce air-entrained hydraulic cement mixes for other reasons. Additionally, it was discovered that higher compressive strengths were beneficially achieved using the additive of the invention. For convenience, cocamide DEA derived by the ester process will be described as ester-derived cocamide DEA.

Ester-derived cocamide DEA is commercially available under the trademarks Comperlan KD and Standamid KD from Henkel International GmbH, Dusseldorf, West Germany, and Ninol 49CE from Stepan Company, Northfield, Ill.

The term "coconut acid" usually means a mixture of fatty acids derived from the hydrolysis of coconut oil, and having acid chain lengths varying from 6 to 18 carbons, but mostly 10, 12, and 14 carbons. A preferred coconut acid is one consisting approximately of the following range of fatty acids:

| | |
|---|---|
| Lauric Acid | 46-58% |

| -continued | |
|---|---|
| Myristic Acid | 15-23% |
| Palmitic Acid | 8-14% |
| Stearic and Oleic Acid | 7-24% |

Further, the coconut acid preferably should have an acid value of between about 246 and 260, a saponification value of between about 247 and 262, and an iodine value of between about 10 and 20.

The resulting cocamide DEA reaction product from the reaction of the coconut ester and diethanolamine will preferably comprise approximately the following composition and have a pH value (of a 1% solution) in the range of 8-10 and a density in the range of 8.3 to 8.5 pounds per gallon, preferably about 8.43 pounds per gallon:

| | |
|---|---|
| Coconut Amide | 85-90% |
| Coconut Ester | 0-10% |
| Free Coconut Acid | 0-0.5% |
| Free Diethanolamine | 0-5% |
| Water | 0.0.5% |

In the practice of the present invention the additive is incorporated into hydraulic cement mixes such as portland cement concretes and mortars in amounts sufficient to yield an entrained air void system of the proper amount and quality. As a practical matter the additive is incorporated into the mix as an aqueous solution, which may be of any convenient concentration.

The additive may be incorporated into the mix as a portion of the mix water but it may also be incorporated in any other convenient manner, including adding it to the dry mix or aggregate before the water is incorporated therein.

The term "entrained air" is intended to have the meaning found in the art, namely that by using an agent for that purpose, an intended and desirable amount of air, i.e, 3% to 9%, by volume, based upon the total volume of the hydraulic cement mix, will be incorporated into the plastic hydraulic cement mix and ultimately in the hardened concrete. By this means, the durability or workability of a plain or non air-entrained concrete or mortar can be improved. Further, the materials which comprises a concrete mix, and the mixing itself, can introduce some air into the mix, and often, such is referred to as entrapped air. The additive of the present invention is beneficial in that it unexpectedly produced an intended and desirable amount of air entrainment which further proved to be stable during extended mixing and to be beneficial to the hardened concrete because it resulted in increased compressive strengths.

The term "aggregate" is intended to include both coarse aggregate, such as crushed stone or gravel, and fine aggregate, such as sand, as is common in the art. In general, the aggregate in mortars may be sand or other fine aggregate meeting the requirements of ASTM designation No. C-33. The proportions of coarse aggregate and fine aggregate will vary depending upon the properties and use of the concrete or mortar. In most cases, although not limited thereto, the coarse aggregate will be within the broad range of 2 inches (7.6 cm) to 4 mesh, while the size of the fine aggregate will be within the broad range of about +4 mesh to −200 mesh U.S. Standard Sieve (ASTM C-11). The coarse aggregate will usually be of mineral origin, such as gravel or crushed limestone, but it may be a manufactured aggregate, such as a slag. The amount of aggregate can be up to 80% by weight, based upon the total weight of the hydraulic cement mix, with the range of 20% to 80% by weight being preferred.

For both mortars and concretes, the amount of water employed generally would be enough to effect hydraulic setting of cementitious material in the mix and to provide suitable workability in the plastic state. This would broadly range from about 15% to 30% by weight of the cementitious materials in mortars and about 50% to 85% by weight of the cementitious material in concrete mixes. The precise proportion of water will depend on the end use of the cementitious mix as well as on its composition.

In order to illustrate the effectiveness of ester-derived cocamide DEA in generating air bubbles, as compared to other known and potential air-entraining agents, selected agents were tested in a modified Henkel Foam Test. The following is the "Foam Test Methodology" stated in a Henkel International GmbH technical bulletin for Standamid brand alkanolamides:

"Foam Test Methodology"

"The following test procedure, developed by Henkel, is a simple way to make accurate determination of foam volume and foam drainage:

"Prepare a 10% aqueous solution of product being evaluated. Add six (6) grams of this solution to 144 grams of water, hardness 50 ppm, heated to 29° C.±1° C. Agitate for ten (10) seconds in an osterizer-type blender. Stir/medium speed agitation. Measure the initial foam volume to the nearest 5 ml, ad then record the position of the foam/water interface after 3.5 minutes. This later reading represents the foam drainage."

The test was modified by using 5% by weight aqueous solutions and placing 300 cc of each solution in a measuring container, graduated in millimeters, for use with the osterizer-type blender. As per the Henkel test, the solution is agitated for ten (10) seconds at medium speed. The mixing generates a certain amount of foam which floats above a liquid interface and which is measured as the initial interface. The container is then allowed to sit undisturbed for one (1) hour. When this is done, some or all of the foam returns to liquid. This liquid return is called "foam drainage," and a new liquid-foam interface, or final interface, is established somewhere between the initial interface and the 300 cc level at which the liquid started. The amount of the final liquid-foam interface is then measured. The percent of foam drainage is calculated by dividing the difference between the 300 cc level of each solution and the initial interface and multiplying by 100. The results for each tested agent are reported in Table I. The amount of foam drainage is considered to be a reflection on the stability of the bubbles generated.

Also reported in Table I is the unit weight of the bubbles generated, called bubble density. To obtain the unit weight, a further test was done using the same modified Henkel foam test methodology. Three hundred (300) cc of each solution were placed in the osterizer-type blender, agitated for ten (10) seconds at medium speed, and then allowed to sit undisturbed for one (1) hour. The bubbles or foam remaining were then removed from the mixer, placed in a volumetric measuring unit and weighed. The values were then converted to weight per one cubic foot.

TABLE I

| Agent Tested | Foam Drainage (%) | Bubble Density Pounds/Foot |
|---|---|---|
| Cocamide DEA (Ester-Derived)* | 16.7 | 22.9 |
| Cocoamide DEA (Kritchevsky Process Derived) | 96.6 | 10.4 |
| Cocoamido Proply Betaine | 99.4 | 1.4 |
| Cocoamide DEA (Ester-Derived)** | 86.0 | 12.6 |
| Cocoamide DEA (Oil Derived) | 97.3 | 4.8 |
| Sodium Lauryl Sulfate | 99.3 | 1.5 |
| Ammonium Lauryl Sulfate | 98.0 | 1.7 |
| Lauryl Sulfate Triethanolamine | 99.8 | 1.3 |
| Sodium Octyl Sulfate | 99.2 | 0.9 |
| Disodium Mono-Oleamide/ Diglycol Sulfosuccinate | 98.3 | 1.7 |
| Wood Resin Salts | 98.1 | 1.8 |
| Alkyl Phenoxy Polyethoxy Ethanol | 98.0 | 1.9 |

*Supplied by Source I (Henkel)
**Supplied by Source II (Stepan)

These results demonstrate that ester-derived cocamide DEA has a superior combination of bubble volume retention as measured by the low foam drainage and greater unit weight. Of particular interest is the performance against wood resin salts, such as are used in Vinsol resin air-entraining admixtures, as compared to ester-derived cocamide DEA. The ester-derived cocamide DEA from Source I performed the best and resulted in only 16.7% foam drainage versus 98.1% for the wood resin salts. Also, the ester-derived cocamide DEA (Source I) tested at a 22.9 lb./cu. ft. unit weight versus 1.8 lb./cu. ft. for the wood resin salts. The cocamide DEA from Source II was not as good a performer as that from Source I, but still had an acceptable combination of foam drainage (86.0%) and bubble density (12.6 lb./cu. ft.), especially compared, e.g., to the Kritchevsky process-derived cocamide DEA, which had a relatively high bubble density of 10.4 lb./cu. ft., but a very high foam drainage of 96.6%. Thus, an ester-derived cocamide DEA having a foam drainage of at most about 86% or less and a bubble density of 12 lbs./cu. ft. or more is preferred.

The reason for the greater unit weight for ester-derived cocamide DEA is speculated to be due to greater thickness of the bubble walls. When a portion of the bubbles produced in the modified Henkel foam test is placed on a spherical depression slide and examined using a standard laboratory microscope, the cocamide DEA bubbles from Source I are seen as spherical bubbles having thicker walls, while the wood resin bubbles are relatively thin-walled and tend to be less than spherical with some shapes being oblong. This sort of differences should produce a more stable air and uniform bubble structure in a hydraulic cement mix environment.

For the purpose of illustrating the advantageous results obtainable by the practice of the present invention in hydraulic cement mixes, concrete mixes were prepared according to ASTM designation Nos. C-494 and C-233. Mixes containing the additives of the present invention and Vinsol resin additives were made. The sequence of operations in this procedure were: preparation of concrete mixes with a nominal slump of 2 inches±½ inch and a dosage of air-entraining admixture per 100 pounds of cement such as would produce an air content of 5.5%±0.5% by volume of the concrete. Each mix was designed for a total of 517 lbs./yd.³ portland cement, a sand-aggregate ratio of 0.89, and the same water-to-cement ratio (0.31). The concrete, with an appropriate amount of water to attain the specified slump value was then mixed in a concrete mixer of 6 cubic feet capacity. Next, 6"×12" cylinder specimens were taken for subsequent determinations of compressive strengths and the parameters of the air void system after hardening. The initial air content of a sample of the plastic concrete was determined by the pressure-meter method as described in ASTM standard test method NO. C-231 and the slump value, which is an index of workability, was determined in accordance with ASTM standard method No. C-143.

The results of the tests are shown in Table II and a comparison is made between an ester-derived cocamide DEA (from Source I) and Vinsol resin air-entraining agent. In each case the rate of hardening was within the ASTM No. C-233 specification. It can be seen from Table II that the ester-derived cocamide DEA produced the intended and desirable amount of air as well as favorable air retention and further achieved significant compressive strength gains in comparison to the concrete containing Vinsol resin.

TABLE II

| TEST RESULTS | | |
|---|---|---|
| Vinsol Resin (Control) | Ester-Derived Cocamide DEA | Difference As Percent Of Control |
| Entrained Air (%) | | |
| 6.0 | 5.7 | |
| Compressive Strength (PSI) | | |
| 1 Day | | |
| 1950 | 2360 | 121% |
| 3 Days | | |
| 3410 | 3950 | 116% |
| 7 Days | | |
| 4140 | 4530 | 109% |
| 28 Days | | |
| 5235 | 5640 | 108% |

In order to evaluate the entrained air in the hardened concrete, one of the specimens from the concrete made using ester-derived cocamide DEA and produced in the tests discussed above was examined microscopically in accordance with ASTM standard method No. C-457, with the results being reported in Table III.

TABLE III

| AIR VOID ANALYSIS | | | | |
|---|---|---|---|---|
| Air Content % by Volume | | Paste# Content | Specific Surface | Spacing Factor |
| (Plastic) | (Hardened) | % by Volume | Inches $^{-1}$ | L, Inch |
| 5.7 | 6.7 | 23.83 | 500 | 0.007 |

Sum of the volumes of portland cement and mixing water

As can be seen, the spacing factor L is 0.007 inch, which is less than the 0.008 inch factor and more than 0.004, which is the usual recommended limits on the spacing factor for durable, i.e., resistant to freezing and thawing, concrete.

In another test, a comparison was made between plain concrete, which was the control and contained no air-entraining agent, a Vinsol resin mix and a mix containing an ester-derived cocamide DEA (Source I). The mix designs were similar to those in Table II except that the slumps were 4 inches±½ inch. As can be seen in Table IV, the ester-derived cocamide DEA achieved significantly higher compressive strengths than the Vinsol resin and the plain control mix, and produced desirable air entrainment.

TABLE IV

| | Control Mix | Vinsol Resin Mix | Ester Derived DEA Mix |
|---|---|---|---|
| Dosage (% by Weight) of Cement | — | 0.0087 | 0.0039 |
| Air Content (% by Volume) at 10 Minutes | — | 5.1% | 5.8% |
| 7 Day Avg. PSI | 3497 | 3520 | 3820 |
| (% Compared to Plain) | | (100.7) | (109.2) |
| 28 Day Avg. PSI | 4400 | 4316 | 4733 |
| (% Compared to Plain) | | (98.1) | (107.6) |

In yet another test, extended mixing time was done with a series of concrete mixes containing an ester-derived cocamide DEA from Source I (Mix A), ester-derived cocamide DEA from Source II (Mix B), and a Kritchevsky process-derived cocamide DEA (Mix C), such as used in the tests reported in Table I. This test was done to establish the performance of stability of the air bubbles over a period of mixing time such as would be comparable to concrete mixed in the field. The mix design is shown in Table V. The mixing was done continuously for 50 mixtures, except when samples were taken to measure the air content. At that time additional water was added to restore the slump, as close as possible to its original value.

TABLE V

| Concrete Mix Design | | | | | | |
|---|---|---|---|---|---|---|
| Cement | 564 lbs. Medusa Type 1 | | | | | |
| Stone (2% H₂O) | 1834 lbs. Sandusky Limestone | | | | | |
| Sand (6% H₂O) | 1377 lbs. Twin Lakes | | | | | |
| Water | 202 lbs. | | | | | |
| Additive | .0039% per weight of cement | | | | | |
| Mixing | Mix A | | Mix B | | Mix C | |
| Time | Slump | Air | Slump | Air | Slump | Air |
| 4 min. | 4¼" | 4.5% | 4" | 6.5% | 4½" | 3.5% |
| 15 min. | 4" | 6.5% | 4" | 7.0% | 3" | 3.0% |
| 30 min. | 3" | 6.5% | 3" | 5.5" | 1" | 2.5" |
| 45 min. | 2½" | 6.5% | 1½" | 4.0% | — | — |
| 50 min. (remix)¹ | 3¾" | 6.6% | 4¾" | 4.5% | — | — |

¹Water was added to bring slump back to approximate original slump.

As can be seen in Table V, the additive of the invention, namely an ester-derived cocamide DEA, achieved a desirable amount of air entrainment, which proved to be relatively stable with extending mixing. This can be contrasted with Mix C which contained a Kritchevsky process-derived cocamide DEA and which produced only minimal air entrainment and which showed poor air retention. In fact, the test was stopped after 30 minutes because air dropped below the desirable minimum of 3% air entrainment. The air content and retention values certainly seem to correlate with the foam drainage and bubble density data shown in Table I and demonstrate that ester-derived cocamide DEA is a superior air-entraining agent.

Further testing was conducted to confront the problem of holding air contents stable in varying FMs on fine aggregate used in concrete. It was noted that with the straight, ester-derived cocamide DEA and sands with FMs in the 3.2 to 3.5 range, larger than normal doses were needed to achieve satisfactory air entrainment. Unexpected results were achieved when varying percentages of capramide DEA were added to the ester-derived cocamide DEA. Depending upon the percentage of capramide in relation to the ester-derived cocamide DEA, air contents continued to rise in coarse sands with the increased dosage of capramide DEA. Following tests were run on sands with an FM of 3.3, and the results were as follows:

TABLE VI

| Mixing Time | 6% Ester 0% Capric | 5½% Ester/ ½% Capric | 5% Ester/ 1% Capric | 4% Ester/ 2% Capric |
|---|---|---|---|---|
| 8 minutes | 3.5 | 4.2 | 4.6 | 5.1 |
| 18 minutes | 3.5 | 4.5 | 5.1 | 5.6 |
| 28 minutes | 3.75 | 4.5 | 5.2 | 6.2 |
| 38 minutes | 3.7 | 4.2 | 5.3 | 6.4 |

Note: Initial slump: 2¼"-3".
Note: Water added at 28 minutes to renew initial slump.

The unobvious results obtained by the blending of the capramide DEA and ester-derived cocamide DEA show an increased and stable air entrainment for problem sands in the concrete industry. The capramide DEA is manufactured from predominantly capric fatty acids (C-10). It is basically a foam booster with much less viscosity-building effects than higher alkanolamines. This facilitates enhancement of foam volume, density, lubrication and stability. Depending upon the variabilities in sand, the blending of coconut acid diethanolamine (produced by reacting an alkyl ester and a coconut acid with a diethanolamine) and a capramide diethanolamine, assist in the production of stable volumes of air.

The foregoing addition of capramide DEA solved the problem of achieving satisfactory air entrainment when the sands utilized had a fineness modulus in the range of 2.4 to 3.0, however, air entrainment decreased when fly ash or a sand having a significantly lower fineness modulus was introduced into the mix. The foregoing problem was solved by adding ricinoleic acid to the capramide DEA and the ester-derived cocamide DEA. Tests were conducted on mixes using 14% type "F" fly ash with the foregoing additive, and the results were as follows:

TABLE VII

| | 4.0% Ester 2.5% Capric 1.0% Ricinoleic Acid | | Vinsol Resin Mix | |
|---|---|---|---|---|
| Mixing Time | Slump | Air | Slump | Air |
| 18 minutes | 6" | 8.5% | 6⅜" | 7.5% |
| 36 minutes | 4¼" | 7.75% | 4½" | 6.5% |
| 54 minutes | 2¾" | 6.25% | 3" | 5.25% |
| 72 minutes | 2" | 5.5% | 1¼" | 4.75% |
| 83 minutes (remix)[1] | 4¾" | 6.0% | 3" | 5.25% |

[1] 12 oz. of water was added to increase slump

The data in the above table indicates that the blending of ricinoleic acid, capramide DEA and ester-derived cocamide DEA resulted in increased air entrainment in mixes containing fly ash. Not only did air entrainment increase with the addition of ricinoleic acid, such an addition did not adversely affect compressive strengths, but rather increased same as shown by the following table:

TABLE VIII

| | COMPRESSIVE STRENGTHS (PSI) | |
|---|---|---|
| Drying Time | 4.0% Ester 2.5% Capric 1.0% Ricinoleic Acid | Vinsol Resin Mix |
| 1 Day | 1256 | 1094 |
| 3 Days | 2484 At | 2158 At |
| 7 Days | 2740 8.5% Air | 2536 7.5% Air |

TABLE VIII-continued

| | COMPRESSIVE STRENGTHS (PSI) | |
|---|---|---|
| Drying Time | 4.0% Ester 2.5% Capric 1.0% Ricinoleic Acid | Vinsol Resin Mix |
| 28 Days | 4628 6" Slump | 4518 6⅜" Slump |

The foregoing increase in compressive strength with an increase in air entrainment was not expected since typically an increase in air entrainment results in a decrease in compressive strength. Thus, the blending of ricinoleic acid, capramide DEA and ester-derived cocamide DEA provide two significant benefits, i.e., increased air entrainment and compressive strength.

Similar results were achieved using a blend of ricinoleic acid, capramide DEA and ester-derived cocamide DEA with a sand having a fineness modulus of 2.26. Typically, when sand has such a low fineness modulus, it is difficult to achieve air entrainment of 4.0% or greater with standard dosages. It should be noted that if air entrainment drops to 3.0% or less, it is assumed that the cement does not include any entrained air. Tests were conducted on mixes utilizing sands having a fineness modulus of 2.26 with a blend of ricinoleic acid, capramide DEA and ester-derived cocamide DEA, and the results were as follows:

TABLE IX

| | 4.0% Ester 2.5% Capric 1.0% Ricinoleic Acid | | Vinsol Resin Mix | |
|---|---|---|---|---|
| Mixing Time | Slump | Air | Slump | Air |
| 18 minutes | 5" | 5.0% | 4" | 4.75% |
| 36 minutes | 2¾" | 4.5% | 2¼" | 4.0% |
| 54 minutes | 2¼" | 4.0% | 1¼" | 3.5% |
| 72 minutes | 1½" | 3.75% | ¾" | 3.0% |
| 83 minutes (remix)[1] | 4½" | 4.50% | 3¼" | 3.75% |

[1] 13 oz. of water was added to increase slump

Thus, the blending of ricinoleic acid with capramide DEA and ester-derived cocamide DEA increased the percentage of air entrainment to acceptable levels in mixes using sands having an extremely low fineness modulus. Furthermore, as in the previous case of fly ash, the blending of ricinoleic acid with capramide DEA and ester-derived cocamide DEA also significantly increased the compressive strength of the resulting mix as shown in the following table:

TABLE X

| | COMPRESSIVE STRENGTHS (PSI) | |
|---|---|---|
| Drying Time | 4.0% Ester 2.5% Capric 1.0% Ricinoleic Acid | Vinsol Resin Mix |
| 1 Day | 1463 | 1252 |
| 3 Days | 2318 At | 2130 At |
| 7 Days | 3628 5.0% Air | 3439 4.75% Air |
| 28 Days | 4886 5" Slump | 4492 4" Slump |

The foregoing results as to compressive strength provide a further unexpected result, viz., an increase in compressive strength with an increase in slump. Thus, in this case, the blending of ricinoleic acid with capramide DEA and ester-derived cocamide DEA increased air entrainment, compressive strength and slump.

To further determine the effects of blending ricinoleic acid with capramide DEA and ester-derived cocamide DEA, tests were conducted using such an additive with sand having a fineness modulus of 3.0. The results of these tests, which were conducted at 134° F., are shown in the following table:

TABLE XI

| Mixing Time | 4.0% Ester 2.5% Capric 1.0% Ricinoleic Acid | | Vinsol Resin Mix | |
|---|---|---|---|---|
| | Slump | Air | Slump | Air |
| 18 minutes | 7" | 7.2% | 7¼" | 6.8% |
| 36 minutes | 5½" | 7.3% | 4¼" | 6.5% |
| 54 minutes | 3" | 6.5% | 2" | 5.25% |
| 72 minutes | 2¼" | 5.6% | 1¾" | 4.5% |
| 83 minutes (remix)[1] | 6" | 6.75% | 6" | 5.0% |

[1] 13 oz. of water was added to the 4.0% Ester, 2.5% Capric and 1.0% Ricinoleic Acid mix to increase slump, and 1 lb. 8 oz. of water was added to Vinsol Resin Mix to increase slump.

Here again, the addition of ricinoleic acid to capramide DEA and ester-derived cocamide DEA significantly increased air entrainment even with sands having an average fineness modulus, i.e., 3.0. As in the previous examples, the blending of ricinoleic acid with capramide DEA and ester-derived cocamide DEA also caused a significant increase in compressive strength of the resulting mix, as shown by the following table:

TABLE XII

| | COMPRESSIVE STRENGTHS (PSI) | |
|---|---|---|
| Drying Time | 4.0% Ester 2.5% Capric 1.0% Ricinoleic Acid | Vinsol Resin Mix |
| 1 Day | 1556 | 1314 |
| 3 Days | 3034 At | 2632 At |
| 7 Days | 4248 7.2% Air | 3688 6.8% Air |
| 28 Days | 5434 7" Slump | 4806 7¼" Slump |

In this case the blending of ricinoleic acid with capramide DEA and ester-derived cocamide DEA provided a very significant increase in compressive strength, approximately 15%.

From the foregoing, it is obvious that the blending of ricinoleic acid with capramide DEA and ester-derived cocamide DEA provided a number of desirable results. For example, the use of ricinoleic acid as part of the additive increased air entrainment regardless of the fineness modulus of the sand utilized or whether fly ash was introduced into the mix. Even with extended mixing times, the percentage of air entrainment remained above acceptable limits. Thus, mixes containing ricinoleic acid and capramide DEA and ester-derived cocamide DEA can tolerate longer travel and mix time to the ultimate use site. At the use site, the user would typically add water to increase the slump which may increase air entrainment, however, it has been found that such an increase is generally insignificant. With the addition of ricinoleic acid to capramide DEA and ester-derived cocamide DEA, air entrainment will remain at acceptable levels even with extended mixing times and the addition of water does not have to be depended upon to slightly increase air entrainment. It has been further found that mixes containing ricinoleic acid, capramide DEA and ester-derived cocamide DEA can tolerate relatively high temperatures for extended period of times. For example, the temperature utilized for the test in Tables XI and XII was 134 degrees F. Thus, high temperatures do not have an adverse affect on mixes utilizing ricinoleic acid in combination with capramide DEA and ester-derived cocamide DEA. This is not the case with mixes utilizing other types of additives. In summary, the blending of ricinoleic acid with capramide DEA and ester-derived cocamide DEA produced very desirable and beneficial results.

While the invention has been described with reference to certain preferred embodiments thereof, those skilled in the art will appreciate that various modifications and substitutions can be made without departing from the spirit of the invention. In particular in the context of this invention, aqueous solutions of the components described may have added thereto small amounts of compatible chelating agents for alkaline earth cations such as magnesium or calcium which normally occur in ordinary water but which also tend to precipitate surface active agents. Also, small amounts of compatible cosmetic coloring agents or biocides or the like may be added. Further, the admixture of the present invention could be used with other admixtures added for their intended purposes, e.g., the use of water-reducing admixtures to increase compressive strength or accelerating or retarding admixtures to change the rate of set of the hydraulic cement mixes. Thus, it is intended that the invention will be limited only by the scope of the claims which follow.

We claim:

1. A hydraulic cement mix comprising a hydraulic cement, aggregate, sufficient water to effect hydraulic setting of the cement, and an air-entraining additive consisting essentially of a coconut acid diethanolamide produced by reacting alkyl ester of coconut acid with diethanolamine, said additive being in an effective amount of between 0.0013% and 0.004%, a capramide diethanolamine in an effective amount of between 0.008% and 0.0024%, and ricinoleic acid in an effective amount of between 0.0003% and 0.001% by weight based upon the weight of the cement, whereby air will be entrained in said mix in an amount of 3% to 9% by volume of said mix.

2. A hydraulic cement mix in accordance with claim 1, wherein said hydraulic cement comprises portland cement.

3. A hydraulic cement mix in accordance with claim 1, wherein said aggregate is present in an amount of up to 80% by weight, based upon the total weight of the hydraulic cement mix.

4. A hydraulic cement mix in accordance with claim 1, wherein said aggregate is present in an amount of from 20% to 80% by weight.

5. A hydraulic cement mix in accordance with claim 1, wherein said coconut acid is comprised as follows:

| Lauric Acid | 46–58% |
|---|---|
| Myristic Acid | 15–23% |
| Palmitic Acid | 8–14% |
| Stearic and Oleic Acid | 7–24% |

6. A hydraulic cement mix in accordance with claim 1, wherein said coconut acid diethanolamide reaction product comprises:

| Coconut Acid Diethanolamide | 85–90% |
|---|---|
| Coconut Acid Alkyl | 0–10% |
| Coconut Acid | 0–0.5% |
| Diethanol Amine | 0–5% |

7. A hydraulic cement mix in accordance with claim 1, wherein said reaction is conducted with equal moles of coconut alkyl ester and diethanolamine.

8. A hydraulic cement mix in accordance with claim 1, wherein said capramide diethanolamine comprises:

| | |
|---|---|
| Octanoic Acid $C_8$ | 0.5–1.5% |
| Capric Acid $C_{10}$ | 94–98% |
| Lauric Acid $C_{12}$ | 1.5–2.5% |

9. A hydraulic cement mix in accordance with claim 1, wherein said ricinoleic acid comprises:
12-Hydroxy-9-Octadecenoic Acid.

10. A process for entraining air in a hydraulic cement mix, which includes hydraulic cement, aggregate, and sufficient water to effect hydraulic setting of the cement, comprising the addition of an additive consisting essentially of coconut acid diethanolamide, produced by reacting alkyl ester of coconut acid with diethanolamine, said additive being in an effective amount of between 0.0013% and 0.004%, a capramide diethanolamine in an effective amount of between 0.008% and 0.0024%, and ricinoleic acid in an effective amount of between 0.0003% and 0.001% by weight based upon the weight of the cement, whereby air will be entrained in said mix in an amount of 3% to 9% by volume of said mix.

11. A process for entraining air in a hydraulic cement mix in accordance with claim 10, wherein said hydraulic cement comprises portland cement.

12. A process for entraining air in a hydraulic cement mix in accordance with claim 10, wherein said aggregate is present in an amount of up to 80% by weight, based upon the total weight of the hydraulic cement mix.

13. A process for entraining air in a hydraulic cement mix in accordance with claim 10, wherein said coconut acid is comprised as follows:

| | |
|---|---|
| Lauric Acid | 46–58% |
| Myristic Acid | 15–23% |
| Palmitic Acid | 8–14% |
| Stearic and Oleic Acid | 7–24% |

14. A process for entraining air in a hydraulic cement mix in accordance with claim 10, wherein said coconut acid diethanolamide reaction product comprises:

| | |
|---|---|
| Coconut Acid Diethanolamide | 85–90% |
| Coconut Acid Alkyl | 0–10% |
| Coconut Acid | 0–0.5% |
| Diethanol Amine | 0–5% |

15. A process for entraining air in a hydraulic cement mix in accordance with claim 10, wherein said reaction is conducted with equal moles of coconut alkyl ester and diethanolamine.

16. A process for entraining air in a hydraulic cement mix in accordance with claim 10, wherein said capramide diethanolamine comprises:

| | |
|---|---|
| Octanoic Acid $C_8$ | 0.5–1.5% |
| Capric Acid $C_{10}$ | 94–98% |
| Lauric Acid $C_{12}$ | 1.5–2.5% |

17. A hydraulic cement mix in accordance with claim 10, wherein said ricinoleic acid comprises:
12-Hydroxy-9-Octadecenoic Acid.

18. A product made in accordance with the process of claim 10.

* * * * *